United States Patent [19]

McFadden

[11] 4,078,315

[45] Mar. 14, 1978

[54] PRERECORDED TAPE RECORDING AND BRANCHED METHOD OF INSTRUCTING USING SAME

[76] Inventor: Fred Lee McFadden, 551 W. Surf St., Chicago, Ill. 60657

[21] Appl. No.: 733,314

[22] Filed: Oct. 18, 1976

[51] Int. Cl.² ............................................. G09B 7/02
[52] U.S. Cl. ..................................... 35/8 A; 35/9 A; 35/35 C
[58] Field of Search ...................... 35/8 A, 9 A, 35 C; 360/72

[56] References Cited

U.S. PATENT DOCUMENTS

| | | | |
|---|---|---|---|
| 2,558,853 | 7/1951 | Kappeler | 360/72 |
| 3,194,895 | 7/1965 | Treadwell | 35/8 A X |
| 3,408,749 | 11/1968 | Brudner | 35/9 A |
| 3,484,950 | 12/1969 | Serrell et al. | 35/9 A |
| 3,662,120 | 5/1972 | Hess | 35/35 C X |
| 3,673,346 | 6/1972 | Gordon et al. | 35/9 A UX |
| 3,735,503 | 5/1973 | Dow et al. | 35/9 A |
| 3,810,316 | 5/1974 | Lahlou | 35/8 A |

Primary Examiner—William H. Grieb
Attorney, Agent, or Firm—Olson, Trexler, Wolters, Bushnell & Fosse, Ltd.

[57] ABSTRACT

Apparatus and a method are disclosed for offering branch programming for instructional purposes. The apparatus comprises a tape player of the cassette variety, preferably having a tape index or counter. A prerecorded tape cassette carrying the program of instruction is also included. The tape has a plurality of segments of primary material recorded over corresponding spans of tape in a forward direction on a first track. A plurality of segments of supplemental material related to the primary material are recorded in a reversed direction on a second track. The primary material segments each terminate in segment-defining indicia aligned with the initiation of the corresponding secondary material segment. In use, the listener plays a primary material information segment, and then stops the tape player. If further development of the subject is desired, the listener removes the cassette, and flips it over or reverses its orientation. He then reinstalls it in and upon the tape player. When the tape player is again started, the supplemental information is provided. After listening to this information, the listener rewinds the tape to the supplemental information segment initiation point by reference to the tape index or counter in one form of the invention. The listener then again reverses the orientation of the cassette, and listens to a subsequent primary material information segment.

16 Claims, 4 Drawing Figures

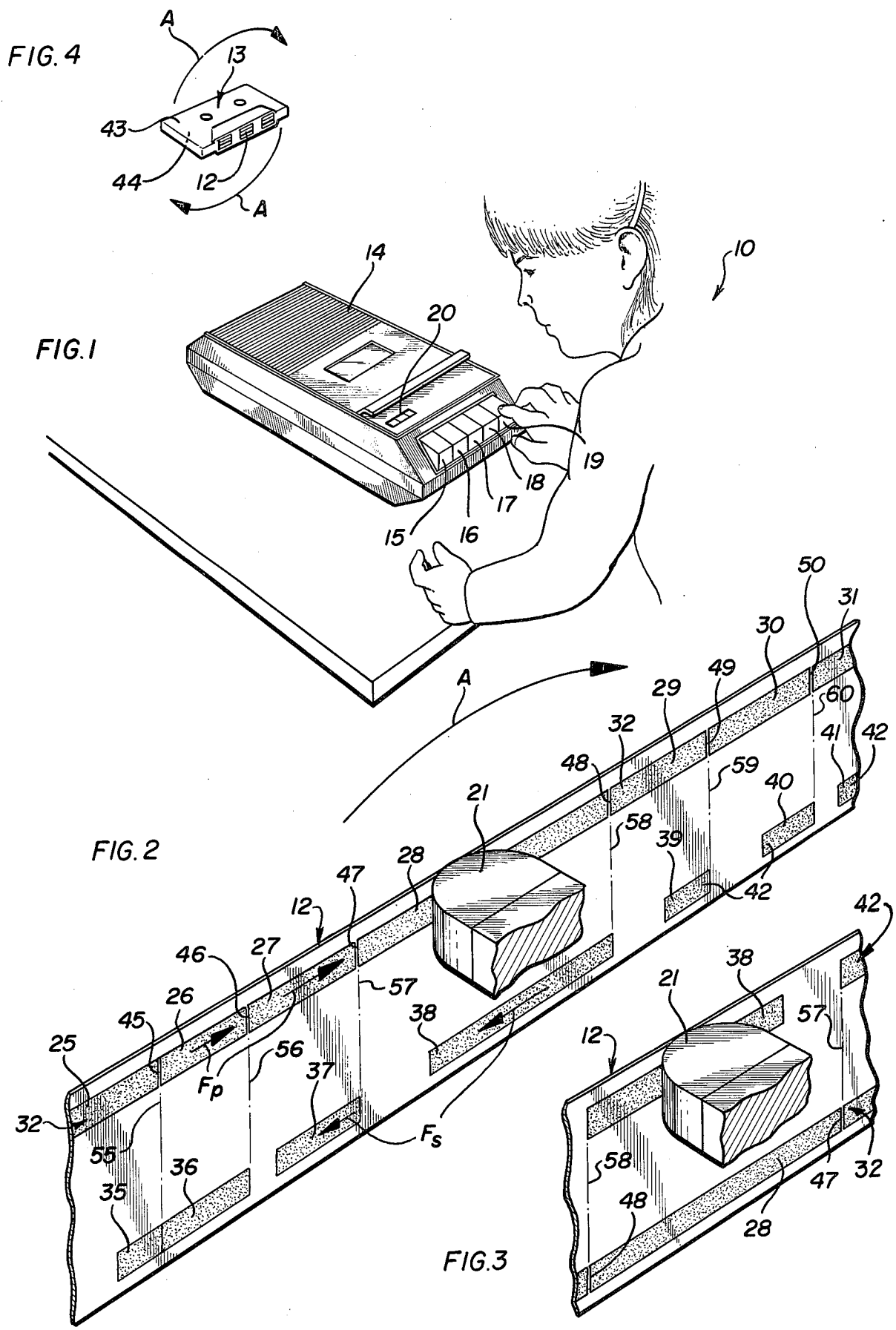

PRERECORDED TAPE RECORDING AND BRANCHED METHOD OF INSTRUCTING USING SAME

BACKGROUND OF THE INVENTION

This invention relates generally to methods and apparatus for instruction, and more particularly concerns a branched tape recording and related apparatus for use in education, training, entertainment or the like.

Pre-recorded tape cassette audio programs have recently gained widespread acceptance for use in teaching a variety of subjects. These pre-recorded cassette tapes and the related apparatus have been found highly effective in providing clear and cogent instruction in foreign languages, mathematics, science, music, language arts, literature, social studies, medicine and a wide variety of other subjects, both technical and non-technical.

Since many such pre-recorded programs are used in government-finances educational institutions such as public schools and the like, it is important to minimize costs; the cost of playback apparatus is important to school purchasers. From a practical standpoint, conventional playback hardware and tape cassette formats have proved the most popular since they can be most widely used at least cost to most schools.

Until now, audio cassette programs designed for use on sucu conventional tape cassette playback hardware have been strictly linear in format. That is, the listener begins receiving his audio instruction at the beginning of the tape, and must listen to the instruction at the rate of progress provided on the tape. The listener cannot vary the pace of tape speed or instruction. While the listener can stop the tape to ponder an idea or back up the tape to repeat a segmemt which he finds troublesome, he cannot skip ahead to a predetermined point in the tape learning program, or pass over material he does not need, with any sure knowledge of where to stop the tape and resume his instruction.

Put differently, the traditional linear tape programming provides no opportunity for branching in learning. It locks the listener into a real time presentation from which he cannot escape.

The general object of the present invention is to provide branch programming on an ordinary tape cassette and cassette player.

A more specific object of the invention is to provide branched programming using an ordinary casette player and tape playback device without any specialized modification to the tape, the tape cassette, or the playback device itself.

Another specific object of the invention is to provide flexibility in instruction through branched programming, and to provide that flexibility and branched programming on an inexpensive, easy-to-use basis.

Yet another specific object of the invention is to provide branched programming wherein the branches provide supplementary answers, examples, explanation, illustration, commentary, additional instructions, translations, and the like.

Other ojbects, advantages and uses of the invention will become apparent upon reading the following detailed description and upon reference to the drawing. For example, the invention may well find use in the presentation of sound film strips, sound slide presentations, sound with print, audio-tutorial programs, programmed learning and the like. It also provides a format for presenting stepped programs for performing maintenance, troubleshooting, operating procedures and the like. Throughout the drawings, like reference numerals refer to like parts and objects.

BRIEF DESCRIPTION OF THE DRAWINGS

FIG. 1 is a perspective view showing an individual listening to and learning from an audio cassette recorded and programmed as provided in the invention;

FIG. 2 is a perspective view showing, in schematic form, instructional information provided or recorded on tape in accordance with the invention, a tape playback head being associated with the tape to provide an audio signal in response to the taped information;

FIG. 3 is a perspective view showing, in schematic form, the tape of FIG. 2 in alternate or secondary segment playback position; and FIG. 4 is a perspective view of the tape cassette used in the tape player.

DETAILED DESCRIPTION OF THE INVENTION

While the invention will be described in connection with a preferred embodiment and procedure, it will be understood that it is not intended to limit the invention to this embodiment or procedure. On the contrary, it is intended to cover all alternatives, modifications, and equivalents as may be included within the spirit and scope of the invention as defined by the appended claims.

Turning first to FIG. 1, there is shown an individual 10 who is receiving intruction by the novel method of the invention from an ordinary cassette-type tape recording prepared in accordance with the invention. The pre-recorded tape 12 (FIGS. 2 and 3) is here contained within an ordinary cassette 13 (FIG. 4), and the cassete in turn is installed in a cassette tape player 14. This cassette tape player 14 is of known design an is equipped with the usual start button 15, stop button 16, rewind button 17, fast forward button 18 and other controls 19. The cassette player 14 is also equipped with an index counter 20 which here embodies a device for measuring the amount of tape passing a tape player head 21 (shown schematically in FIGS. 2 and 3) or other reference point and for returning the tape to that reference point with ease. It will also be understood that, in accordance with common practice in such cassettes and tape players 14, the cassette 13 can be removed from the tape player 14, flipped or turned over as suggested by the arrows A in FIG. 4, and reemplaced within and upon the tape player 14 for further playing action.

In accordance with one aspect of the invention, the tape 12 is pre-recorded so as to have a plurality of segments of primary material (schematically shown as segments 25–31 respectively) recorded over corresponding spans of tape in a forward direction, as indicated by the arrows $F_p$ on a first type track 32. A plurality of segments of supplemental material (schematically illustrated as segments 35–41 inclusive) have been recorded on the tape in a reverse direction on a second track 42 as illustrated by the arrows $F_s$ in FIG. 2. It will be understood that the terms primary and supplemental are here used as terms of convenience, and do not signify the relative importance of the material recorded on the tape tracks.

In further accordance with the invention and for reasons to be explained below, each primary material segment 25–31 terminates in a definite segment-defining terminal indicia 45–50. These first and second tracks are so located on the tape 12 as to permit the first track 32 to be driven past the tape player playback head 21 when the cassette is installed on the tape player with a first cassette side 43 in a given orientation as shown in FIGS. 2 and 4, and to permit the second track 42 to be driven past the tape player head 21 when the cassette is flipped over, or installed on the tape player with a second cassette side 44 in that given orientation, as can be envisioned from FIGS. 3 and 4.

Inaudible signals can be used to automatically halt tape playing at a segment terminal point if appropriate cassette apparatus is available, but audible signals such as verbal instruction, a beep, bell or the like can be provided to alert the listener to manually halt tape play at the segment end. This manual operation will, of course, reduce cost. If the tape is to be used to instruct young children, the terminal signal can comprise a dog's bark, a telephone ring, or other well-known sound. It will be understood that while the segments and indicia are shown visually in FIGS. 2 and 3 for purposes of clearly illustrating the invention, no visual indication will ordinarily appear upon the magnetic tape prepared and used in accordance with the invention.

In still further accordance with the invention, it will be noted that each supplemental material segment 35–41 begins on the second tape track 42 at substantially the same longitudinal point on the tape where the corresponding primary material segment 25–31 terminates and where the related termination indicator 45–50 is located, as illustrated by the imaginary alignment guides 55–60 inclusive. When the supplementary material segments 35–41 are arranged as shown, it will be understood that a supplemental material segment 36 can extend over substantially the entire span of tape carrying the corresponding primary material segment 26 as illustrated in FIGS. 2 and 3. A supplemental material segment need not, however, necessarily be of the same length as the primary material segment if less recorded material or information is desired, as can be envisioned by comparing the primary segment 27 and its corresponding secondary segment 37.

When the arrangement by which instructional material is recorded upon the tape 12 is understood, the method by which the tape and tape player are used can be envisioned, and it will be noted that the method of use can be explained to the user without difficulty. First, the cassette 13 and pre-recorded tape 12 are placed on the tape player 14 in a first playing position. Instruction is then begun by starting the tape player; the player plays a primary information segment of tape in the first direction $F_p$ by operating in a forward mode. The tape playing and primary instruction continue until an indicated primary information segment terminal point is reached. Here, in the interest of economy as explained above, an aural signal is provided to the listener. When the listener 19 hears the aural signal, he stops the tape player. He then takes out the cassette and reverses it, or flips it over as indicated by the arrows A in FIG. 4 so as to place the cassette 13 on the tape player 14 in a second playing position. When the cassette 13 is located on the tape player 14, further tape driving by the tape player in its forward mode will play the tape in a direction of tape motion which is reversed relative to the first direction of tape motion, and the corresponding supplemental information of tape is played in reversed direction $F_s$.

When the listener flips over the cassette, the tape 12 is automatically located, relative to the tape playback head 21, at the corresponding supplemental information segment initiation point. By using this fact, branched programs of instruction can be offered. If, for example, mathematics instruction is being provided, the primary material segment can include a posed problem, an intermediate stop point, and, subsequent to that stop point, the end solution to the posed problem. The student can listen to the posed problem, halt the tape temporarily at the intermediate stop point, attempt to work the problem, and compare his answer to the end solution announced after the stop point. If the student's solution to the problem is not the same as that provided on the primary tape segment, the student then flips the tape cassette over at the primary material termination point as described above, and listens to the material provided on the supplemental material segment. This supplemental material segment can provide intermediate information regarding the method by which the announced end solution can be derived.

After the supplemental information segment has been heard and the end of the supplemental information segment has been reached, the listening student can alter the tape drive of the cassette 14 to operate in a reverse mode, and thereby rewind the tape in the cassette to the combined first primary information segment terminal point/supplemental information segment initiation point. The student then again flips the cassette over or reverses its orientation relative to the tape player so as to once again place the cassette and tape on the tape player in the first playing position, and then continues to play the tape in its first orientation so as to play a subsequent primary information segment of tape in the first direction by the tape player operating in the forward mode.

When the listener rewinds the tape as described above so as to again place the tape, relative to the tape playback head, at the combined primary information segment terminal point/secondary information initiation point, it is helpful to use the tape counter 20. After playing the first primary information segment and prior to playing the related secondary information segment, the student either notes the number on the counter or sets the counter at a zero reference point when flipping over the cassette. After listening to the secondary information segment, the student rewinds the tape in the cassette only to the extent necessary to re-reach the counter reference point previously noted or set. This step orients the tape substantially at the combined first primary information segment terminal point and the initiation point of the subsequent primary information segment.

When the end of the supplemental information segment has been reached, an alternate course of action can be used by the listening student. In this alternate method of receiving instruction, the student immediately flips the cassette over or reverses its orientation so as to once again place the cassette and tape on the tape player in the first playing position. If the primary segment is of a length substantially equal to the secondary segment (as, for example, the primary segment 26 and its corresponding secondary segment 36) the listener will have thus placed the tape once again at the beginning of the primary segment. The listener can then again review or listen to the primary segment and, if desired, thereafter play a subsequent primary information segment by continuing to drive the tape in its first direction by the tape player operating in the forward mode. By playing the tape in this looping manner, no tape rewinding or reference to a counter or index is necessary.

It will be noted that this looping method of receiving instruction does not necessarily require that the secondary segments by precisely the same length as the corresponding primary segments of material. If the primary material includes introductory information and, thereafter, specific exemplary or other material, and if this secondary segment has a length substantially equal only to that exemplary material recording length, use of the invention in this looping mode will simply cause the listener to hear the introductory material, the example, the secondary material and then to hear the exemplary material once again without requiring the listener to again review the primary introductory material as well.

By using the novel arrangement of recorded material and method of instruction, each individual student's interests can be maintained at a high level. Each student can listen to instruction and work problems or perform exercises at an individually set pace. No student need waste time reviewing or reworking problems or concepts which he understands. Rather, the student can move on to relatively advanced work in the minimum amount of time. When the student finds he cannot work a problem correctly, or feels the need for supplemental information, he can simply flip over the cassette and gain access to the supplemental information at any branch point in the course of instruction.

These features urge the listener to become throughly engrossed or involved in receiving the recorded information or instruction. For maximum learning, it is important to provide manipulative activities and response opportunities as a part of the process. The described apparatus and method provide these activities and opportunities. Further, the listener can skip deadly unwanted and unneeded explanation. The reward for knowing a problem answer or correctly conducting a required operation can be an uninterrupted continuation of the story line, or the music, or the check list. Nevertheless, the opportunity for remediation is always present, and is presented in a completely private and non-threatening format for those who want it.

For a commercial publisher or other producer of audio programming, the described system has all the self-pacing virtues of a teaching machine, but requires no expensive or customized hardware. The pre-recorded tape cassettes can be offered not only to schools and other institutions, but also to those who already own a personal cassette player. Only a relatively short period of instruction is needed to acquaint the listener with the method of operating the tape player and tape so as to utilize the present invention. These features, in turn, minimize the expense of apparatus for the users, and encourage their attractiveness in the marketplace.

The invention is claimed as follows:

1. For use with a tape player capable of accepting a tape-carrying cassette and a reversible cassette capable of being installed alternatively in either of two positions on the tape player so as to drive the tape alternatively in a forward and a reverse direction relative to the cassette, a tape having a plurality of segments of primary material recorded over corresponding spans of tape in a forward direction on a first track, each primary material segment including a posed question, an intermediate stop point, and an answer to the posed question, and a plurality of segments of supplemental material related to the primary material, the supplemental material being recorded on the tape in a relatively reverse direction on a second track, the primary material segments each terminating in segment-defining indicia to permit a user to understand that the segment has been completely played and to permit the user, if the user desires, to remove the cassette from the tape player, flip over the cassette, and reinstall the cassette on the tape player so as to play the tape, relative to the cassette, in a reverse direction but relative to the tape player in a forward direction, whereby to play the supplental material on the second track, each supplemental material segment being, in length, no longer than the corresponding primary material segment recorded on the same span of tape.

2. Apparatus according to claim 1 wherein said first and second tracks are so located on the tape as to permit the first track to be driven past a tape player playback head when the cassette is installed on the tape player in a first cassette orientation, and to permit the second track to be driven past the tape player playback head when the cassette is installed on the tape player in a second cassette orientation opposite the first orientation.

3. Apparatus according to claim 1 wherein said supplemental material segment begins on the second tape track substantially at the point on the tape where the corresponding primary material segment terminates.

4. Apparatus according to claim 3 wherein the supplemental material segment extends over substantially the entire span of tape carrying the primary material segment.

5. A method of using a tape player having a tape player head, a forward operating mode and a reverse operating mode, and a reversible pre-recording tape-carrying cassette for providing instruction, the method comprising the steps of placing the cassette and pre-recorded tape on the tape player in a first playing position on the tape player, playing a primary information segment of tape in a first direction by the tape player operating in the forward mode to an indicated primary information segment terminal point whereby to receive at least a question, reach an intermediate stop point permitting the user to obtain a solution to the question, and to receive a correct response to the question, all while playing the primary information segment of tape in the first direction in the forward mode, inverting the orientation of the cassette relative to the tape player so as to place the cassette and tape on the tape player in a second playing position in which further tape driving by the tape player in its forward mode will play the tape in a direction which is reversed relative to the first direction in the cassette, operating the tape player drive in its forward mode so as to play a supplemental information segment of tape in that reversed direction relative to the cassette from a combined primary information segment terminal point and supplemental information segment initiation point to receive an explanation of how the correct response to the question can be obtained, driving the tape and orienting the cassette so as to again place the cassette and tape on the tape player in the first playing position, with the tape located, relative to the tape player, substantially at the first primary information segment termination point, and thereafter playing a subsequent primary information segment of tape in the first direction by the tape player operating in the forward mode.

6. A method according to claim 5, wherein said step of driving the tape and orienting the cassette so as to again place the cassette and tape on the tape player in the first playing position with the tape located substantially at the first primary information segment termination point includes the steps of rewinding the tape after playing the secondary information segment to the extent necessary to re-reach a combined first primary information segment termination point and the secondary information segment initiation point, and thereafter again reversing the orientation of the cassette relative to the tape player so as to again place the cassette and tape on the tape player in the first playing position.

7. A method according to claim 5 wherein the step of driving the tape and orienting the cassette so as to again place the cassette and tape on the tape player in the first playing position with the tape located substantially at the first primary information segment termination point includes the steps of again reversing the orientation of the cassette relative to the tape player so as to again place the cassette and tape on the tape player in the first playing position, and again playing at least a portion of the first primary information segment so as to re-reach the first primary information segment termination point.

8. A method according to claim 5 utilizing a tape player having a counter for counting the amount of tape passing a given point on the tape player, the method including the steps of noting a reference point displayed on the counter after playing the first primary information segment and rewinding the tape in the cassette after playing the secondary information segment only to the extent necessary to re-reach the noted counter reference point, thereby orienting the tape substantially at the combined first primary information segment termination point and the initiation point of the subsequent primary information segment.

9. A method according to claim 8 including the steps of setting said counter to a zero reference point after playing the first primary information segment, and rewinding the tape in the cassette after playing the secondary information segment only to the extent necessary to re-reach the counter zero reference point, thereby orienting the tape substantially at the combined first primary information segment termination point and the initiation point of the subsequent primary information segment.

10. A method of using a tape player having a forward operating mode and a reverse operating mode, and a reversible pre-recorded tape-carrying cassette for providing instruction, comprising the steps of placing the cassette and pre-recorded tape on the tape player in a first playing position on the tape player, playing a primary information segment of tape in a first direction by the tape player operating in the forward mode to an indicating primary information segment terminal point whereby to receive at least a question, reach an intermediate stop point permitting the user to obtain a response to the question, and to receive a correct response to the question, all while playing the primary information segment of tape in the first direction in the forward mode, reversing the orientation of the cassette relative to the tape player so as to place the cassette and tape on the tape player in a second playing position in which further tape driving by the tape player in its forward mode will play the tape in a direction which is reversed relative to the first direction, operating the tape player drive in its forward mode so as to play a supplemental information segment of tape in that reversed direction relative to the cassette from a combined primary information segment terminal point and supplemental information segment initiation point to receive an explanation of how the correct response to the question can be obtained, again reversing the orientation of the cassette relative to the tape player so as to again place the cassette and tape on the tape player in the first playing position, replaying at least a portion of the first primary information segment of tape in the first direction by the tape player operating in the forward mode, and thereafter playing a subsequent primary information segment of tape in the first direction by the tape player operating in the forward mode.

11. A method according to claim 10 including the steps of operating the tape player drive in its forward mode so as to play said supplemental information segment of tape for a length of time substantially equal to the length of time during which the related primary material segment was played, and again reversing the orientation of the cassette relative to the tape player so as to again place the cassette and tape on the tape player on the first playing position with the tape located, relative to the tape player, substantially at an initiation point of the first primary information segment.

12. A method of using a tape player having a forward operating mode and a reverse operating mode and a resettable counter for counting the amount of tape passing a given point of the tape player, and a reversible pre-recorded tape-carrying cassette for providing instruction, comprising the steps of placing the cassette and pre-recorded tape on the tape player in a first playing position on the tape player, playing a primary information segment of tape in a first direction by the tape player operating in the forward mode to an indicated primary information segment terminal point whereby to receive at least a question, reach an intermediate stop point permitting the user to obtain a response to the question, and to receive a correct response to the question, all while playing the primary information segment of tape in the first direction in the forward mode, setting the counter to a zero reference, reversing the orientation of the cassette relative to the tape player so as to place the cassette and tape on the tape player in a second playing position in which further tape driving by the tape player in its forward mode will play the tape in a direction which is reversed relative to the first direction, operating the tape player drive in its forward mode so as to play a supplemental information segment of tape in that reversed direction relative to the cassette from a combination of the primary information segment terminal point and a supplemental information segment initiation point to receive an explanation of how the correct response to the question can be obtained, rewinding the tape in the cassette after playing the secondary information segment only to the extent necessary to reach the counter zero reference point, again reversing the orientation of the cassette relative to the tape player so as to again place the cassette and tape on the tape player in the first playing position with the tape located, relative to the tape player, substantially at a first primary information segment initiation point, and thereafter playing a subsequent primary information segment of tape in the first direction by the tape player operating in the forward mode.

13. A method of using a tape player having a tape player head, a forward operating mode, and a reverse operating mode, and a counter for counting the amount of tape passing a given point on the tape player, and a reversible pre-recorded tape-carrying cassette for providing instruction; the method comprising the steps of placing the cassette and pre-recorded tape on the tape player in a first playing position on the tape player, playing a primary information segment of tape in a first direction by the tape player operating in the forward mode to an indicated primary information segment terminal point, noting a reference point displayed on the counter after playing the first primary information segment, removing the cassette from the tape player, inverting the orientation of the cassette relative to the tape player, replacing the cassette on the tape player in its inverted position so as to place the cassette and tape on the tape player in a second playing position in which further tape driving by the tape player in its forward mode will play the tape in a direction which is reversed relative to the first direction in the cassette, operating the tape player drive in its forward mode so as to play a supplemental information segment of tape in that reversed direction relative to the cassette from a combined primary information segment terminal point and supplemental information segment initiation point, rewinding the tape in the cassette after playing the secondary information segment only to the extent necessary to re-reach the noted counter reference point, thereby reorienting the tape substantially at the combined first primary information segment termination point and the initiation point of the subsequent primary information segment, again removing the cassette from the tape player, re-inverting the orientation of the cassette relative to the tape player, replacing the cassette on the tape player in its re-inverted position so as to replace and thereafter playing the subsequent primary information segment of tape in the first direction by the tape player operating in the forward mode.

14. A method according to claim 13, wherein said step of driving the tape and orienting the cassette so as to again place the cassette and tape on the tape player in the first playing position with the tape located substantially at the first primary information segment termination point includes the steps of observing the counter and simultaneously rewinding the tape after playing the secondary information segment to the extent necessary to re-reach a combined first primary information segment termination point and the secondary information segment initiation point, and thereafter re-inverting the cassette relative to the tape player so as to again place the cassette and tape on the tape player in the first playing position.

15. A method according to claim 13 wherein the step of driving the tape and orienting the cassette so as to again place the cassette and tape on the tape player in the first playing position with the tape located substantially at the first primary information segment termination point includes the steps of re-inverting the cassette relative to the tape player so as to again place the cassette and tape on the tape player in the first playing position, and thereafter again playing at least a portion of the first primary information segment so as to re-reach the first primary information segment termination point.

16. A method according to claim 13 including the steps of setting said counter to a zero reference point after playing the first primary information segment, and rewinding the tape in the cassette after playing the secondary information segment only to the extent necessary to re-reach the counter zero reference point, thereby orienting the tape substantially at the combined first primary information segment termination point and the initiation point of the subsequent primary information segment.

* * * * *

UNITED STATES PATENT AND TRADEMARK OFFICE
CERTIFICATE OF CORRECTION

PATENT NO. : 4,078,315
DATED : March 14, 1978
INVENTOR(S) : Fred Lee McFadden

It is certified that error appears in the above-identified patent and that said Letters Patent are hereby corrected as shown below:

Column 1, line 21, "finances" should be --financed--;

Column 1, line 29, "sucu" should be --such--;

Column 3, line 7, after "player" insert --playback--;

Column 6, line 11, "suppleental" should be --supplemental--;

Column 6, line 36, "recording" should be --recorded--;

Column 7, line 55, "indicating" should be --indicated--

Signed and Sealed this

Fifteenth Day of August 1978

[SEAL]

Attest:

RUTH C. MASON
Attesting Officer

DONALD W. BANNER
Commissioner of Patents and Trademarks